US007697739B2

(12) United States Patent
Sakaida

(10) Patent No.: US 7,697,739 B2
(45) Date of Patent: Apr. 13, 2010

(54) METHOD, APPARATUS AND PROGRAM FOR IMAGE PROCESSING, AND ABNORMAL SHADOW DETECTION

(75) Inventor: Hideyuki Sakaida, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1208 days.

(21) Appl. No.: 10/875,490

(22) Filed: Jun. 25, 2004

(65) Prior Publication Data

US 2004/0264755 A1 Dec. 30, 2004

(30) Foreign Application Priority Data

Jun. 26, 2003 (JP) ............................. 2003-182092
Jun. 26, 2003 (JP) ............................. 2003-182093

(51) Int. Cl.
*G06K 9/00* (2006.01)
(52) U.S. Cl. ........................... 382/128; 128/922; 378/4
(58) Field of Classification Search ................ 382/128, 382/129, 130, 131, 132, 133, 100; 128/922; 378/4–27

See application file for complete search history.

(56) References Cited

U.S. PATENT DOCUMENTS

| 4,482,918 | A | * | 11/1984 | Keyes et al. ............. 378/98.11 |
| 4,855,598 | A | | 8/1989 | Ohgoda et al. |
| 5,048,103 | A | | 9/1991 | Leclerc et al. |
| 5,123,054 | A | * | 6/1992 | Hara et al. ................. 382/130 |
| 5,285,786 | A | * | 2/1994 | Fujii ......................... 600/425 |
| 5,289,374 | A | | 2/1994 | Doi et al. |
| 5,485,371 | A | * | 1/1996 | Ito et al. ....................... 378/20 |
| 6,594,378 | B1 | | 7/2003 | Li et al. |
| 7,043,064 | B2 | * | 5/2006 | Paik et al. .................... 382/128 |
| 2001/0002934 | A1 | | 6/2001 | Oosawa |
| 2002/0150304 | A1 | | 10/2002 | Ockman |
| 2003/0206668 | A1 | | 11/2003 | Nakajima et al. |

FOREIGN PATENT DOCUMENTS

| JP | 2000-48187 A | 2/2000 |
| JP | 2002505594 | 2/2002 |
| JP | 2002-109510 A | 4/2002 |
| JP | 2002-293354 A | 10/2002 |
| JP | 2003512112 | 4/2003 |
| WO | 9836683 | 8/1998 |

OTHER PUBLICATIONS

"Active Appearance Model (AMM)" T.F. Cootes, G. J. Edwards, and C. J. Taylor, Active Appearance Models, Proc. European Conference on Computer Vision 1998, vol. 2, pp. 484-498, Springer.
"Eigenfaces for Recognition", Matthew Turk and Alec Pentland, Journal of Congnitive Neuroscience, vol. 3, No. 1, 1991, pp. 71-86.
Japanese Abstract No. 2002133397, dated May 10, 2002.
Carrato S et al: "A gradient-directed unsharp masking algorithm for synchrotron radiation angiography", Apr. 11, 1989, pp. 269-272, XP010083281.

* cited by examiner

*Primary Examiner*—Anand Bhatnagar
(74) *Attorney, Agent, or Firm*—Sughrue Mion, PLLC

(57) ABSTRACT

A normal structure element image representing normal structure of at least predetermined one of structure elements of an object images of which are included in an image of the object is artificially generated. A structure-removed image, which is an image obtained by removing the predetermined structure element from the image of the object, is generated by an image operation between the image of the object and the normal structure element image of the predetermined structure element.

23 Claims, 10 Drawing Sheets

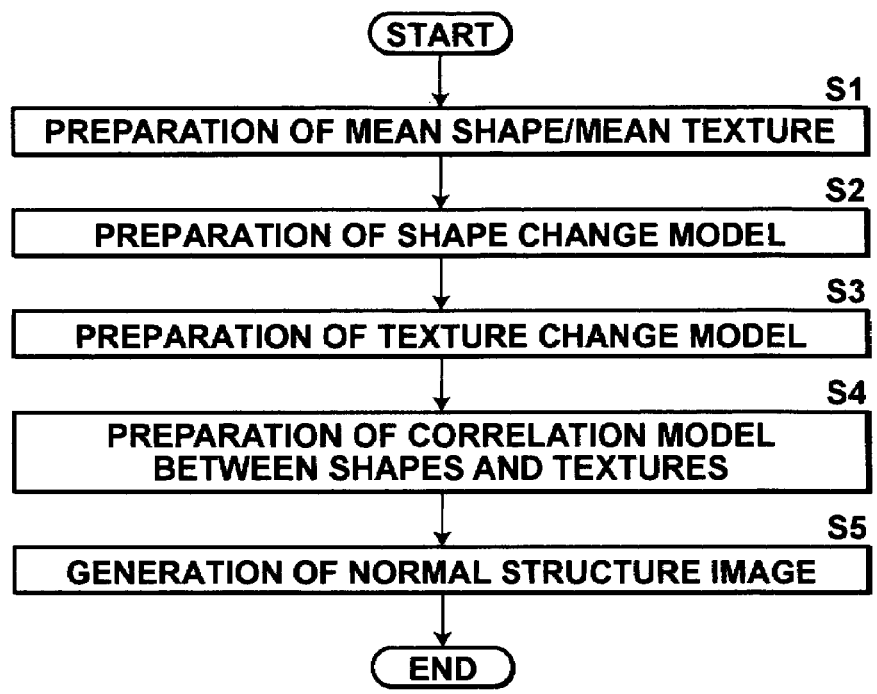
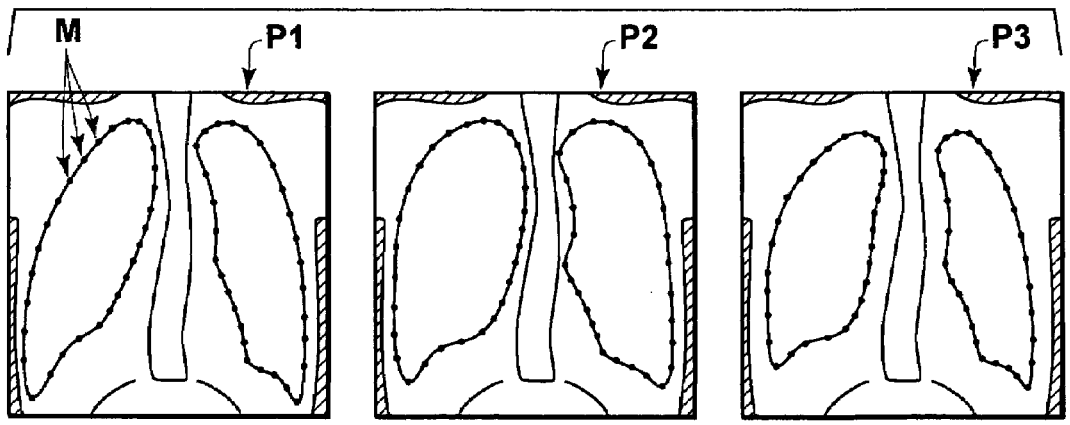

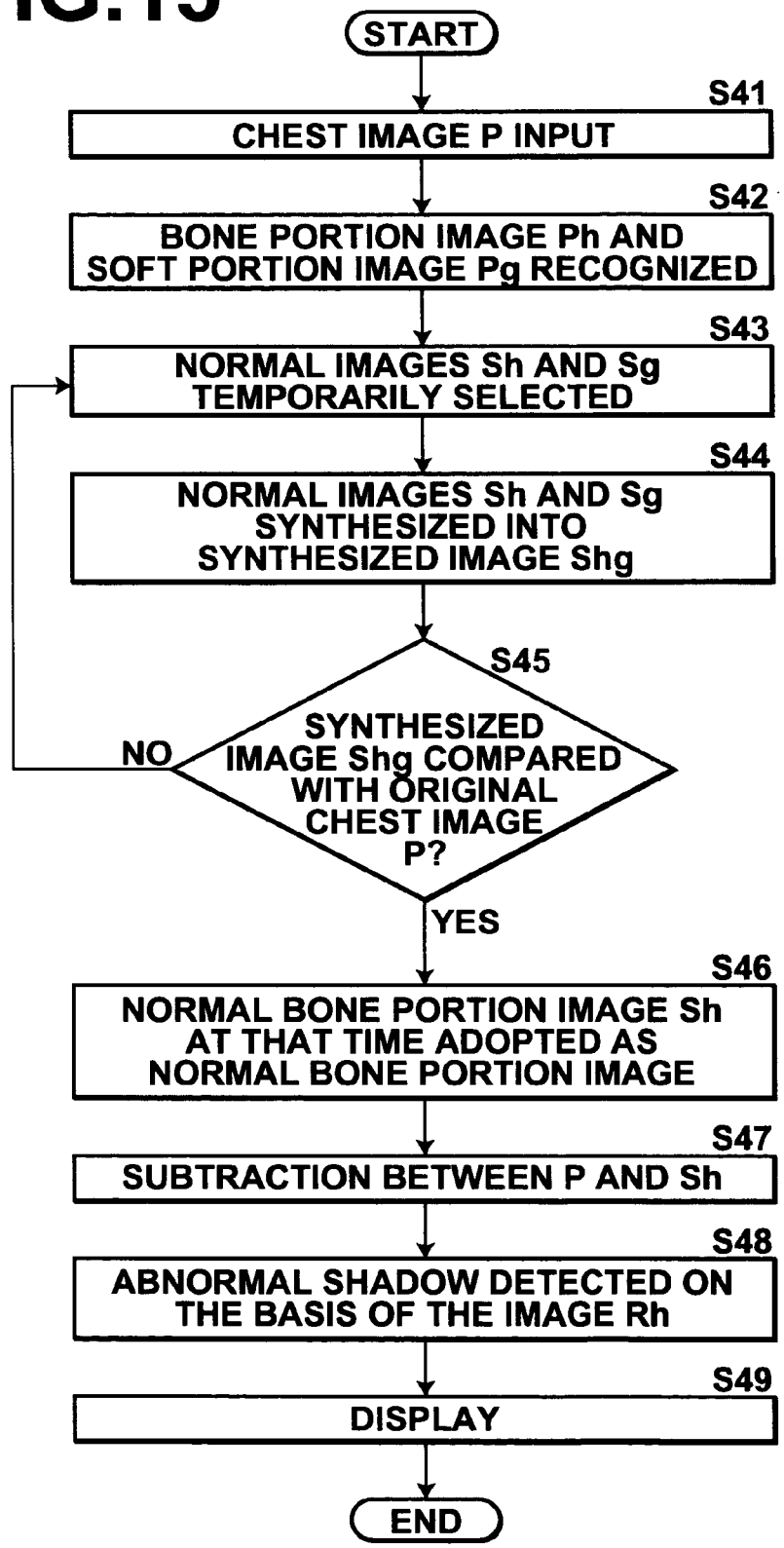

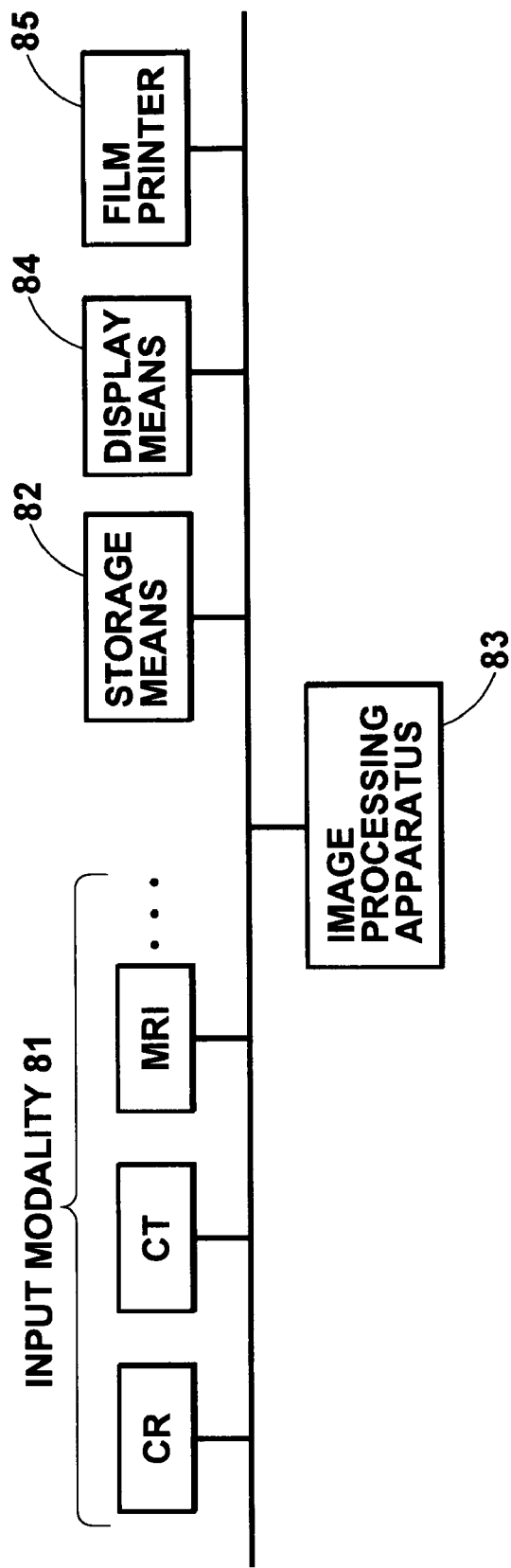

METHOD, APPARATUS AND PROGRAM FOR IMAGE PROCESSING, AND ABNORMAL SHADOW DETECTION

BACKGROUND OF THE INVENTION

1. Field of the Invention

This invention relates to an image processing method for forming an image suitable for image diagnosis such as abnormal shadow detection, an apparatus for carrying out the image processing method, a computer program for causing a computer to execute the image processing method, a computer readable medium on which the program is recorded, an abnormal shadow detecting method using the image processing method, a computer program for causing a computer to execute the abnormal shadow detecting method, and a computer readable medium on which the program is recorded.

2. Description of the Related Art

When detecting an abnormal shadow representing a growth or the like on the basis of a medical image representing a predetermined affected part, so-called energy subtraction has been carried out in order to make invisible the bone which is an obstruction to the detection.

Energy subtraction is a process for generating an image free from a part of the structure element of an object by preparing two images of the same object different in X-ray dose and taking the difference between the two images on the basis of the fact that the X-ray absorption for a given amount of X-rays irradiated to the object differs from structure element to structure element of the object. That is, by subtracting a bone-enhanced image (an image in which bones are enhanced) from a soft-part-enhanced image (an image in which soft parts are enhanced), an image free from bones can be obtained. An image obtained in this way is referred to as "an energy-subtraction image". See U.S. Pat. No. 4,855,598 (will be referred to as "patent publication 1", hereinbelow).

Further, when detecting an abnormal shadow representing a newly generated growth or the like, so-called temporal subtraction has been carried out in order to obtain an image of a predetermined affected part in which the abnormal shadow is enhanced.

Temporal subtraction is a process for generating an image in which change with time of the affected part is enhanced by preparing two images of the same object taken in different times and taking the difference between the two images. When an image representing the part before generation of the disease and normal is used as a past image, an image in which an abnormal shadow representing a newly generated growth or the like is enhanced can be obtained. See U.S. Patent Laid-Open No. 20010002934 (will be referred to as "patent publication 2", hereinbelow).

However, there has been a problem in energy subtraction in that two images of the same object different in X-ray dose must be prepared, and there has been a problem in temporal subtraction in that two images taken in different times must be prepared. That is, the two processes both require a plurality of images, and an image from which bones are removed or in which an abnormal shadow is enhanced cannot be obtained only a single image taken in a simple manner.

In order to obtain an image from which bones are removed or in which an abnormal shadow is enhanced, a special system and/or a special technique is required, which results in the fact that an image necessary to the image diagnosis cannot be effectively generated.

Further, in the medical field, there has been put into practice computer-aided abnormal shadow detection (CAD) in which an abnormal shadow in a digital medical image is automatically detected by the use of a computer. As the computer-aided abnormal shadow detection (CAD), there has been known chest CAD in which, on the basis of a digital chest X-ray image, a growth shadow in the chest is detected.

The chest X-ray image includes so-called feature background image comprising images of structure elements having various anatomical features such as ribs, a clavicle and the like, which is an obstruction to detection of an abnormal shadow and deteriorates the detection capability.

U.S. Pat. No. 5,289,374 (will be referred to as "patent publication 3, hereinbelow) proposes a technology in which chest CAD is performed after removing the feature background image by filtering.

However, since a chest is complicated in anatomical structure and the feature background image cannot be satisfactorily removed from the chest X-ray image by the chest CAD employing filtering, the detection capability cannot be improved by the approach.

SUMMARY OF THE INVENTION

In view of the foregoing observations and description, the primary object of the present invention is to provide an image processing method and image processing apparatus which can effectively generates an image necessary to the image diagnosis.

Another object of the present invention is to provide an abnormal shadow detecting method and an abnormal shadow detecting apparatus using the image processing method.

Still another object of the present invention is to provide a computer program for causing a computer to execute the image processing method.

Yet still another object of the present invention is to provide a computer readable medium on which the computer program is recorded.

Yet still another object of the present invention is to provide a computer program for causing a computer to execute the abnormal shadow detecting method.

Yet still another object of the present invention is to provide a computer readable medium on which the computer program is recorded.

In accordance with the present invention, there is provided a first image processing method comprising the steps of artificially generating a normal structure element image representing normal structure of at least predetermined one of structure elements of an object images of which are included in an image of the object, and generating a structure-removed image, which is an image obtained by removing the predetermined structure element from the image of the object, by an image operation between the image of the object and the normal structure element image of the predetermined structure element.

In accordance with the present invention, there is provided a first image processing apparatus comprising an object image input means which inputs an image representing an object comprising a plurality of structure elements, a normal structure element image generating means which artificially generates a normal structure element image representing normal structure of at least predetermined one of the structure elements of the object, and a structure-removed image generating means which generates a structure-removed image, which is an image obtained by removing the predetermined structure element from the image of the object, by an image operation between the image of the object and the normal structure element image of the predetermined structure element.

In the first image processing method, the step of generating a normal structure element image may comprise the steps of obtaining image data representing an image representing normal structure of a structure element the same in kind as the predetermined structure element, setting a plurality of structure change vectors for changing the structure of the structure element of the same kind, and adding the structure change vectors to the image data.

In the first image processing apparatus, the normal structure image generating means may comprise an image data obtaining means which obtains image data representing an image representing normal structure of a structure element the same in kind as the predetermined structure element, a setting means which sets a plurality of structure change vectors for changing the structure of the structure element of the same kind, and a structure change vector adding means which adds the structure change vectors to the image data.

The "normal structure element image" as used here is an image of a structure element which is normal in structure (shape and texture).

The "image representing normal structure of a structure element the same in kind as the predetermined structure element" as used here may be an image of a structure element having a statistically mean shape and a statistically mean texture taking, for instance, different images of a structure element, which is the same in kind as the predetermined structure element and is normal, as samples (teacher data) and the "structure change vector" may be of a value obtained by multiplying by a coefficient an eigenvector calculated by performing main component analysis on the shape and the texture of the structure element.

In the first image processing method, the step of generating a normal structure element image may comprise the steps of obtaining image data representing an image representing normal structure of an object the same in kind as said original object, setting a plurality of structure change vectors for changing the structure of the object of the same kind, generating a normal object image representing a normal structure of the original object corresponding to the image of the object by adding the structure change vectors to the image data, and generating the normal structure element image by the use of a neural net which extracts a normal image of a structure element in the normal object image which is the same in kind as the predetermined structure element from the normal object image on the basis of the normal object image.

Similarly, in the first image processing apparatus, the normal structure element image generating means may comprise an image data obtaining means which obtains image data representing an image representing normal structure of an object the same in kind as said original object, a structure change vector setting means which sets a plurality of structure change vectors for changing the structure of the object of the same kind, a structure change vector adding means which generates a normal object image representing a normal structure of the original object corresponding to the image of the object by adding the structure change vectors to the image data, and an image generating means which generates the normal structure element image by the use of a neural net which extracts a normal image of a structure element in the normal object image which is the same in kind as the predetermined structure element from the normal object image on the basis of the normal object image.

As a technology of artificially generating the image, a technology employing AAM (Active Appearance Model) can be used. The technology employing AAM will be described in detail later.

When artificially generating an image representing a structure element of an object image, an image representing normal structure of the structure element is generated as described above. This is because when image operation is performed by the use of an image including therein abnormal structure, an obtained image will include abnormal elements in addition to abnormal elements which is inherent to the object image and accordingly will not be suitable for the image diagnosis.

In accordance with the present invention, there is provided a second image processing method comprising the steps of selecting an image substantially conforming to a normal structure element image representing normal structure of at least predetermined one of structure elements of an object an image of which are included in an image of the object from a plurality of artificially generated different images each representing an image representing normal structure of a structure element the same in kind as the predetermined structure element, and generating a structure-removed image, which is an image obtained by removing the predetermined structure element from the image of the object, by an image operation between the image of the object and the selected image.

In accordance with the present invention, there is provided a second image processing apparatus comprising an object image input means which inputs an image representing an object comprising a plurality of structure elements, an image storage means which stores a plurality of artificially generated different images each representing an image representing normal structure of a structure element the same in kind as the predetermined one of the structure elements of the object, an image selecting means which selects an image substantially conforming to a normal structure element image representing normal structure of the predetermined structure image from the images stored in the image storage means, and a structure-removed image generating which generates an image obtained by removing the predetermined structure element from the image of the object, by an image operation between the image of the object and the selected image.

In the first image processing method and the first image processing apparatus, a normal structure element image representing normal structure of the predetermined structure element is generally generated on the basis of the image of the object. To the contrast, in the second image processing method and the second image processing apparatus, it is selected from a plurality of artificially generated different images which have been generated in advance.

In the step of selecting an image and the image selecting means, a technology in which an image which most resembles the image of the object in the histogram of the image data (density signal) is selected as disclosed in U.S. Patent Laid-Open No. 20030206668 can be employed. The image of the object may be determined to more resemble the image of the object, for instance, as dispersion of the difference between the histogram of the image of the object and those of the stored images becomes smaller.

In accordance with the present invention, there is provided a first computer program which causes a computer to execute an image processing method comprising the steps of artificially generating a normal structure element image representing normal structure of at least predetermined one of structure elements of an object images of which are included in an image of the object, and generating a structure-removed image, which is an image obtained by removing the predetermined structure element from the image of the object, by an image operation between the image of the object and the normal structure element image of the predetermined structure element.

In accordance with the present invention, there is provided a second computer program which causes a computer to execute an image processing method comprising the steps of selecting an image substantially conforming to a normal structure element image representing normal structure of at least predetermined one of structure elements of an object images of which are included in an image of the object from a plurality of artificially generated different images each representing an image representing normal structure of a structure element the same in kind as the predetermined structure element, and generating a structure-removed image, which is an image obtained by removing the predetermined structure element from the image of the object, by an image operation between the image of the object and the selected image.

The first and second computer programs may be recorded on a computer-readable medium, which may be loaded in a computer so that the program is installed in the computer to be executed by the computer or may be loaded in a server so that the program can be downloaded into a computer to be installed in the computer.

A skilled artisan would know that the computer-readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

The "image operation" is preferably a subtraction between two images making each pixel in one image to correspond to a pixel in the other image. In this case, the subtraction may be a simple subtraction or may be a subtraction involving weighting. A differential image obtained by subtraction is generally called "a subtraction image".

In the present invention, the image of the object may be a medical image, and the plurality of structure elements may have anatomical features of the object.

The medical image may be a digital image to be used in the image diagnosis, and the image of the object may be a digital chest X-ray image, a digital chest CT image or the like. The "plurality of structure elements may comprise ribs, a clavicle, lung, bronchus, a bone portion representing bones such as ribs or a clavicle, a soft portion representing soft tissues, or the like.

When the object is a human chest and the predetermined structure element is a bone portion, a soft-portion image (corresponding to an energy-subtraction image) representing only soft tissues and free from the bone portion such as ribs or a clavicle can be obtained, whereas when the object is a human chest and the predetermined structure element is all the structure elements, a differential image between an image of a chest to be diagnosed and an image which would be if the chest is normal, that is, an image in which an abnormal shadow is enhanced (a temporal subtraction image) can be obtained.

Though the differential image obtained when the predetermined structure element is set to be all the structure elements may resemble a differential image obtained by an image operation between the image of the object and an image artificially generated to represent normal structure of the whole object, the technology in which an image corresponding to the structure element is generated for each structure element as in the present invention is advantageous in that a more accurate image which better agrees with the image of the object since even if a part of structure elements making up the object is the same in size and/or shape, the other part is not always the same in size, shape and/or texture.

The "image" in this invention includes not only a visible image actually displayed but image data for causing the visible image to be displayed.

In accordance with the present invention, there is further provided a first abnormal shadow detecting method comprising the steps of artificially generating a normal structure element image representing normal structure of at least predetermined one of structure elements of an object images of which have anatomical features and are included in a medical image of the object, generating a structure-removed image, which is an image obtained by removing the predetermined structure element from the image of the object, by an image operation between the image of the object and the normal structure element image of the predetermined structure element, and detecting an abnormal shadow in the structure-removed image on the basis of the structure-removed image.

In accordance with the present invention, there is further provided a first abnormal shadow detecting apparatus comprising an object image input means which inputs a medical image representing an object comprising a plurality of structure elements having anatomical features, a normal structure element image generating means which artificially generates a normal structure element image representing normal structure of at least predetermined one of the structure elements of the object, a structure-removed image generating means which generates a structure-removed image, which is an image obtained by removing the predetermined structure element from the image of the object, by an image operation between the image of the object and the normal structure element image of the predetermined structure element, and an abnormal shadow detecting means which detects an abnormal shadow in the structure-removed image on the basis of the structure-removed image.

In the step of detecting an abnormal shadow and the abnormal shadow detecting means, the abnormal shadow may be detected, for instance, by a method of detecting a shadow of growth by the use of an iris filter disclosed in Japanese Unexamined Patent Publication No. 2002-293354.

In accordance with the present invention, there is further provided a second abnormal shadow detecting method comprising the steps of selecting an image substantially conforming to a normal structure element image representing normal structure of at least predetermined one of structure elements of an object images of which have anatomical features and are included in an image of the object from a plurality of artificially generated different images each representing an image representing normal structure of a structure element the same in kind as the predetermined structure element, generating a structure-removed image, which is an image obtained by removing the predetermined structure element from the image of the object, by an image operation between the image of the object and the selected image, and detecting an abnormal shadow in the structure-removed image on the basis of the structure-removed image.

In accordance with the present invention, there is further provided a second abnormal shadow detecting apparatus comprising, an object image input means which inputs an image representing an object comprising a plurality of structure elements having anatomical features, an image storage means which stores a plurality of artificially generated different images each representing an image representing normal structure of a structure element the same in kind as the predetermined one of the structure elements of the object, an image selecting means which selects an image substantially conforming to a normal structure element image representing normal structure of the predetermined structure image from the images stored in the image storage means and a structure-removed image generating which generates an image obtained by removing the predetermined structure element from the image of the object, by an image operation between the image of the object and the selected image, and an abnormal shadow detecting means which detects an abnormal shadow in the structure-removed image on the basis of the structure-removed image.

In accordance with the present invention, there is further provided a third computer program which causes a computer to execute an abnormal shadow detecting method comprising the steps of artificially generating a normal structure element image representing normal structure of at least predetermined one of structure elements of an object images of which have anatomical features and are included in a medical image of the object, generating a structure-removed image, which is an image obtained by removing the predetermined structure element from the image of the object, by an image operation between the image of the object and the normal structure element image of the predetermined structure element, and detecting an abnormal shadow in the structure-removed image on the basis of the structure-removed image.

In accordance with the present invention, there is further provided a fourth computer program which causes a computer to execute an abnormal shadow detecting method comprising the steps of selecting an image substantially conforming to a normal structure element image representing normal structure of at least predetermined one of structure elements of an object images of which have anatomical features and are included in an image of the object from a plurality of artificially generated different images each representing an image representing normal structure of a structure element the same in kind as the predetermined structure element, generating a structure-removed image, which is an image obtained by removing the predetermined structure element from the image of the object, by an image operation between the image of the object and the selected image, and detecting an abnormal shadow in the structure-removed image on the basis of the structure-removed image.

The third and fourth computer programs may be recorded on a computer-readable medium, which may be loaded in a computer so that the program is installed in the computer to be executed by the computer or may be loaded in a server so that the program can be downloaded into a computer to be installed in the computer.

In accordance with the first image processing method and apparatus, a normal structure element image representing normal structure of one of structure elements of an object images of which are included in an image of the object is artificially generated on the basis of a single image of the object, and an image which corresponds to an energy subtraction image or a temporal subtraction image can be obtained by an image operation between the image of the object and the normal structure element image of the predetermined structure element. Accordingly, an image from which bones are removed or in which an abnormal shadow is enhanced, can be obtained without a special system and/or a special technique, whereby an image necessary to the image diagnosis can be effectively generated.

In the first image processing method, when the step of generating a normal structure element image comprises the steps of obtaining image data representing an image representing normal structure of a structure element the same in kind as the predetermined structure element, setting a plurality of structure change vectors for changing the structure of the structure element of the same kind, and adding the structure change vectors to the image data, an image having any shape and/or texture can be generated according to setting of the structure change vectors, whereby a desired normal structure element image can be accurately generated.

Similarly, in the first image processing apparatus, when the normal structure image generating means comprises an image data obtaining means which obtains image data representing an image representing normal structure of a structure element the same in kind as the predetermined structure element, a setting means which sets a plurality of structure change vectors for changing the structure of the structure element of the same kind, and a structure change vector adding means which adds the structure change vectors to the image data, an image having any shape and/or texture can be generated according to setting of the structure change vectors, whereby a desired normal structure element image can be accurately generated.

Further, in the first image processing method, when the step of generating a normal structure element image comprises the steps of obtaining image data representing an image representing normal structure of an object the same in kind as said original object, setting a plurality of structure change vectors for changing the structure of the object of the same kind, generating a normal object image representing a normal structure of the original object corresponding to the image of the object by adding the structure change vectors to the image data, and generating the normal structure element image by the use of a neural net which extracts a normal image of a structure element in the normal object image which is the same in kind as the predetermined structure element from the normal object image on the basis of the normal object image, a desired normal structure element image can be more accurately generated by virtue of a method other than the AAM.

Similarly, in the first image processing apparatus, when the normal structure element image generating means comprises an image data obtaining means which obtains image data representing an image representing normal structure of an object the same in kind as said original object, a structure change vector setting means which sets a plurality of structure change vectors for changing the structure of the object of the same kind, a structure change vector adding means which generates a normal object image representing a normal structure of the original object corresponding to the image of the object by adding the structure change vectors to the image data, and an image generating means which generates the normal structure element image by the use of a neural net which extracts a normal image of a structure element in the normal object image which is the same in kind as the predetermined structure element from the normal object image on the basis of the normal object image, a desired normal structure element image can be more accurately generated by virtue of a method other than the AAM.

In accordance with the second image processing method and apparatus, an image from which bones are removed or in which an abnormal shadow is enhanced, can be obtained without a special system and/or a special technique, whereby an image necessary to the image diagnosis can be effectively generated as in the first image processing method and apparatus.

BRIEF DESCRIPTION OF THE DRAWINGS

FIG. 1 is a flow chart for illustrating generation of the normal structure image, FIG. 2 is a view showing the three sample images attached with landmarks along the outer periphery of the lung, FIG. 15 is a view showing the flow chart for illustrating operation of the fourth abnormal shadow detecting apparatus, and FIG. 16 is a view briefly showing an example of an image processing system.

DESCRIPTION OF THE PREFERRED EMBODIMENTS

Embodiments of the present invention will be described, hereinbelow. A method of artificially generating a normal structure image of the object or a structure element making up the object will be first described.

In order to artificially generate a normal structure image, a technology proposed by Cootes et al. of University of Manchester in "Active Appearance Models (AAM)" [T. F. Cootes, G. J. Edwards, and C. J. Taylor, Active Appearance Models, Proc, European Conference on Computer Vision 1998, Vol. 2, pp, 484-498, Springer] is employed with a number of sample images of the object or a structure element making up the object and shapes of anatomical features extracted from the sample images (landmark) applied to the AAM as teacher data.

That is, by preparing a statistic model (shape change model, texture change model, or correlation model between shapes and textures) of the object or the structure elements of the object from the teacher data and using the statistic model, a normal structure image having any shape and texture can be artificially generated for the predetermined image.

Though preferably being actually-taken images, the sample images may be artificial images made at random holding featured and normal basic structure of the object or the structure element thereof if a sufficient number of actually-taken images cannot be prepared.

Artificial generation of a normal structure image of the object or a structure element making up the object will be described hereinbelow with reference to a chest normal structure image by way of example.

FIG. 1 is a flow chart for illustrating generation of the normal structure image.

(1) Preparation of a Mean Shape and a Mean Texture (step S1)

Figure 3:
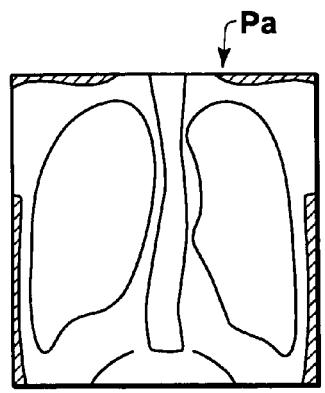
FIG. 3 is a view showing an image representing a mean shape of chest.

Anatomical feature of the shape of the chest is extracted from each of the sample images representing chests as landmarks. FIG. 2 shows three sample images P1, P2 and P3 which have been attached with landmarks along the outer periphery of the lungs. A plurality of black dots indicated at M in FIG. 2 are landmarks. The points which are used as landmarks are anatomically equivalent to each of the sample images. A mean shape of chest is made on the basis of the shapes extracted as landmarks. FIG. 3 shows an image Pa representing a mean shape of chest. When extracting the shapes, it is preferred that the parallel displacement components have been normalized. For example, in the chest images, it is preferred that the top end of the lung be aligned with the middle of the lung in the transverse direction (in the left and right direction).

Figure 4:
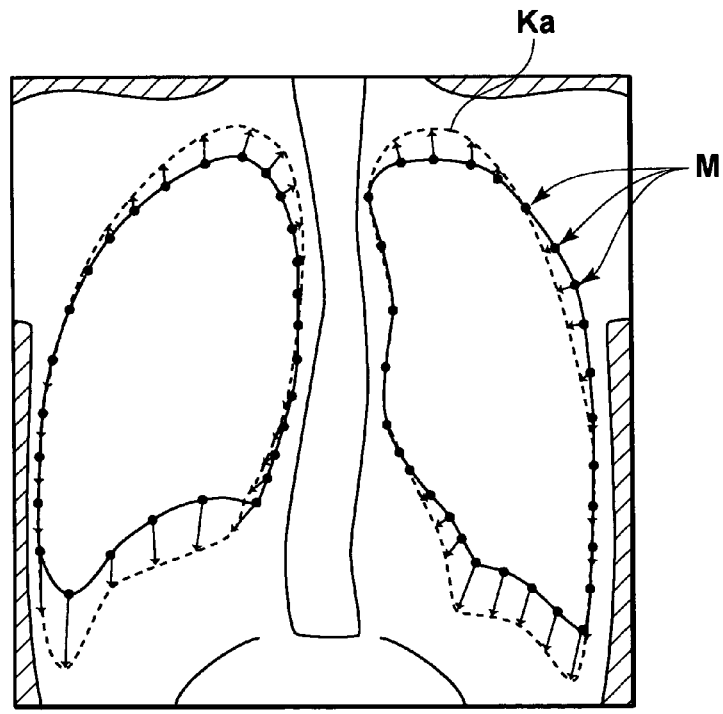
FIG. 4 is a view showing warping of the landmarks along the outer periphery of the lungs to the mean shape.

Then shift of each landmark in each sample image to the corresponding landmark in the means shape is calculated to warp each sample image to the mean shape. FIG. 4 shows warping of the landmarks (indicated at M in FIG. 4) along the outer periphery of the lungs to the mean shape (indicated at Ka in FIG. 4). Shift of each landmarks is approximated by the use of the following two-dimensional quintic polynomials (1) to (4).

$$x' = x + \Delta x \quad (1)$$

$$y' = y + \Delta y \quad (2)$$

$$\Delta x = \sum_{i=o}^{n}\sum_{j=0}^{n-1} a_{ij} \cdot x^i \cdot y^j \quad (3)$$

$$\Delta y = \sum_{i=o}^{n}\sum_{j=0}^{n-1} b_{ij} \cdot x^i \cdot y^j \quad (4)$$

wherein x and y represent the coordinates of each landmark on each sample image, x' and y' represent the coordinates of the points on the mean shape to which the landmark is warped, $\Delta x$ and $\Delta y$ represent the shifts by which the landmark is shifted, n represents the degree and $a_{ij}$ and $b_{ij}$ are coefficients. The coefficient of polynomial approximation is obtained by the least squares method.

The shift of each pixel in each sample image to the corresponding pixel in the mean shape is calculated according to the above formulae and each sample image is warped to the mean shape. When a pixel is to be moved to a position whose coordinates are represented by a decimal fraction, the value of the pixel is obtained by a first-order approximation from its four neighbor pixels. That is, the value of the pixel is distributed to the four neighbor pixels surrounding the coordinates after warping according to the distances therebetween after warping. Then mean texture is prepared on the basis of the sample images warped to the mean shape.

Thus, the mean shape, sample images warped to the mean shape and the mean texture for chests are obtained.

(2) Preparation of a Shape Change Model (Step S2)

Figure 5:
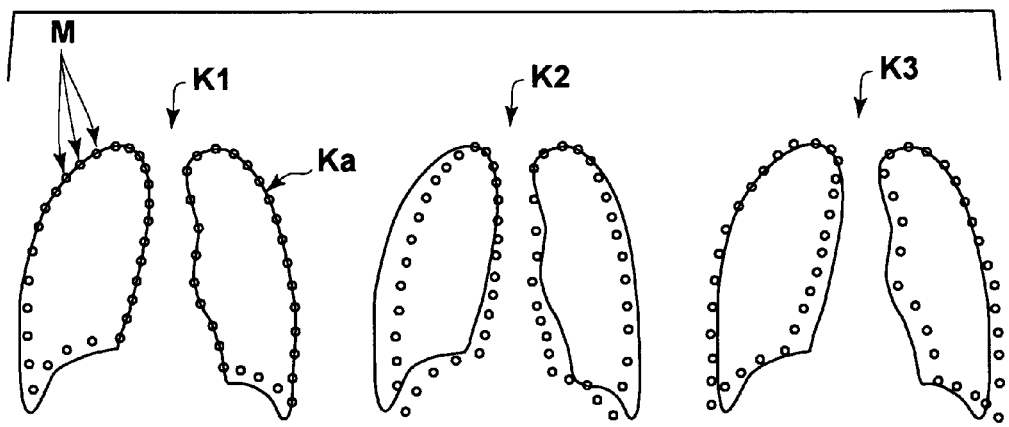
FIG. 5 is a view showing different eigenshapes by landmarks.

Main component analysis is performed on the shape of the chest by the use of the shape of the chest of each sample image and the mean shape of the chest and the eigenshapes are calculated. The eigencomponent is obtained by a technology disclosed in "Eigenfaces for Recognition" by Matthew Turk and Alex Pentland, Journal of Cognitive Neuroscience, vol. 3, No. 1, 1991. Any shape can be approximated as follows by the linear sum of the eigenshapes.

$$x = x_{ave} + Ps \cdot bs \quad (5)$$

wherein x represents a shape vector (x1, y1, ..., xi, yi, ... xn, yn), $x_{ave}$ represents a mean shape vector, Ps represents an eigenvector of the shape and bs represents a set (combination) of shape factors. FIG. 5 shows different eigenshapes K1, K2 and K3 by landmarks M by way of example. In FIG. 5, the solid line Ka represents the mean shape.

(3) Preparation of a Texture Change Model (Step S3)

Figure 6:
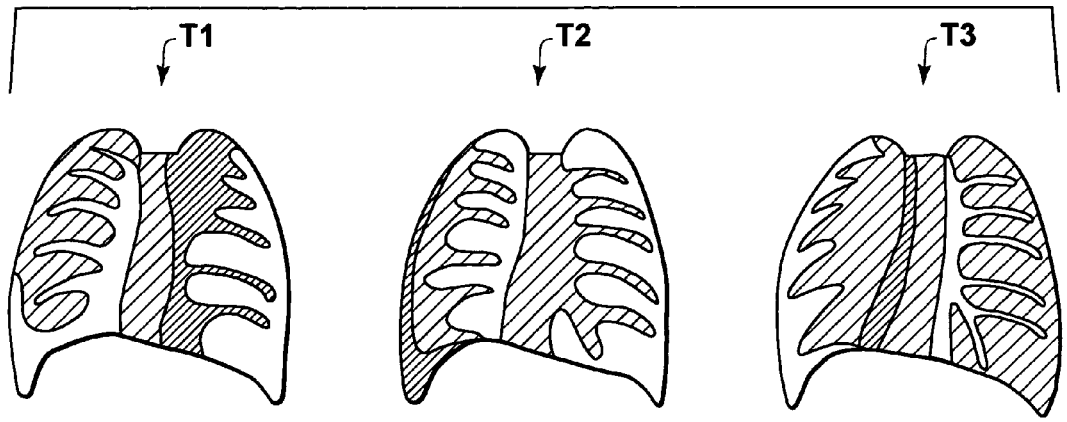
FIG. 6 is a view showing different eigetextures.

Main component analysis is performed on the texture of the chest by the use of the texture of the chest of each sample image and the mean texture of the chest and the eigentextures are calculated.

$$g = g_{ave} + Pg \cdot bg \quad (6)$$

wherein g represents a vector of gray level (the pixel value of the texture) (g1, g21, ..., gij, ..., gnn), $g_{ave}$ represents a mean gray level vector, Pg represents an eigenvector of the gray level and bs represents a set of gray level factors. FIG. 6 shows different eigetextures T1, T2 and T3 by way of example.

(4) Preparation of a Correlation Model Between Shapes and Textures (Step S4)

The shape/texture of the chest in each sample image can be expressed by coefficients bs and bg comprising values projected onto each eigenshape/eigentexture. Main component analysis is performed on the coefficients as will be described hereinbelow and are calculated.

$$b = \begin{pmatrix} Ws \cdot bs \\ \cdots \\ bg \end{pmatrix} = \begin{pmatrix} Ws \cdot Ps^T \cdot (x - x_{ave}) \\ \cdots \\ Pg^T \cdot (g - g_{ave}) \end{pmatrix} \quad (7)$$

wherein Ws is a diagonal matrix and a weight for each shape factor.

$$b = Q \cdot c \quad (8)$$

wherein Q represents an eigenvector and c represents an appearance parameter controlling the shape and the gray level. By changing the appearance parameter, substantially any image of the chest can be artificially generated.

(5) Generation of a Normal Structure Image (Step S5)

A chest normal structure image corresponding to a chest image P is generated according to the following procedure.

1. The value of the appearance parameter calculated from the mean shape and the images in the mean shape is set as an initial value. (normal structure image data setting means)

2. Artificial images are made while the value of the parameter is varied little by little in sequence from the appearance parameters of the upper eigencomponents, and a value of the parameter which provides a difference between the artificial image and the chest image not larger than a predetermined value is searched for. (structure change vector setting means, structure change vector adding means)

3. The artificial image obtained as the value of the appearance parameter is set to the value obtained in 2. is determined to be the chest normal structure image.

According to the above procedure, substantially any image of the chest can be generated by controlling the appearance parameter c if factors such as the mean shape/mean texture, the eigenshape/eigentexture and eigenvector of the object have been calculated.

An image corresponding to the predetermined one of the structure elements making up the object can be generated by preparing images representing only the predetermined structure element as the sample images. For example, an image may be generated by extracting only an area representing the predetermined structure element from an actually-taken image representing the whole object and may be employed as a sample image. Extraction of the area can be performed by the use of an image recognition technology such as a technology employing template matching or a technology in which edges are detected on the basis of change in density or by manually clipping the area.

Embodiment 1

Figure 7:
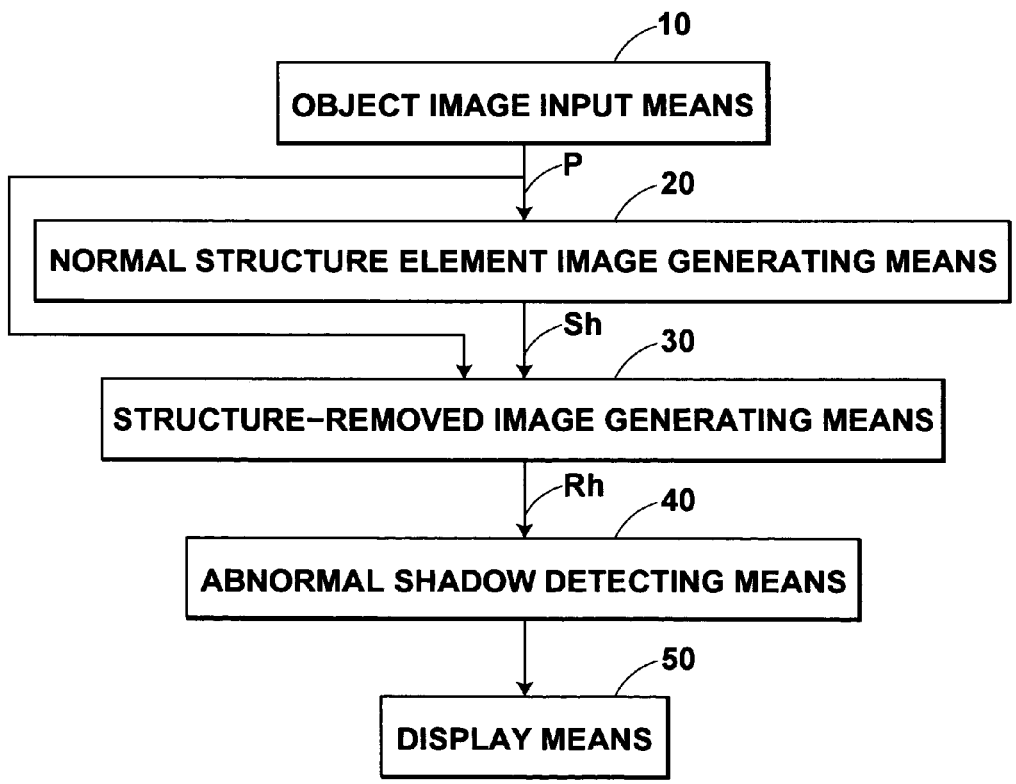
FIG. 7 is a block diagram briefly showing a first abnormal shadow detecting apparatus.

FIG. 7 is a block diagram briefly showing a first abnormal shadow detecting apparatus which is a first embodiment of the present invention. The abnormal shadow detecting apparatus comprises an 10 which inputs a chest radiation image P (will be referred to simply as "chest image", hereinbelow) representing a human chest comprising a bone portion including the ribs, the clavicles and the like and a soft portion, a normal structure element image generating means 20 which estimates and artificially generates a normal bone portion image Sh representing normal structure of the bone portion represented by a bone portion image Ph of the chest image P, a structure-removed image generating means 30 which generates a bone-portion-removed image Rh, which is an image obtained by removing the bone portion image from the chest image, by an image operation between the chest image P and the normal bone portion image Sh, an abnormal shadow detecting means 40 which detects an abnormal shadow in the bone-portion-removed image Rh on the basis of the bone-portion-removed image Rh and a display means 50 which displays on a screen the result of detection of the abnormal shadow together with the bone-portion-removed image Rh.

Figure 8:
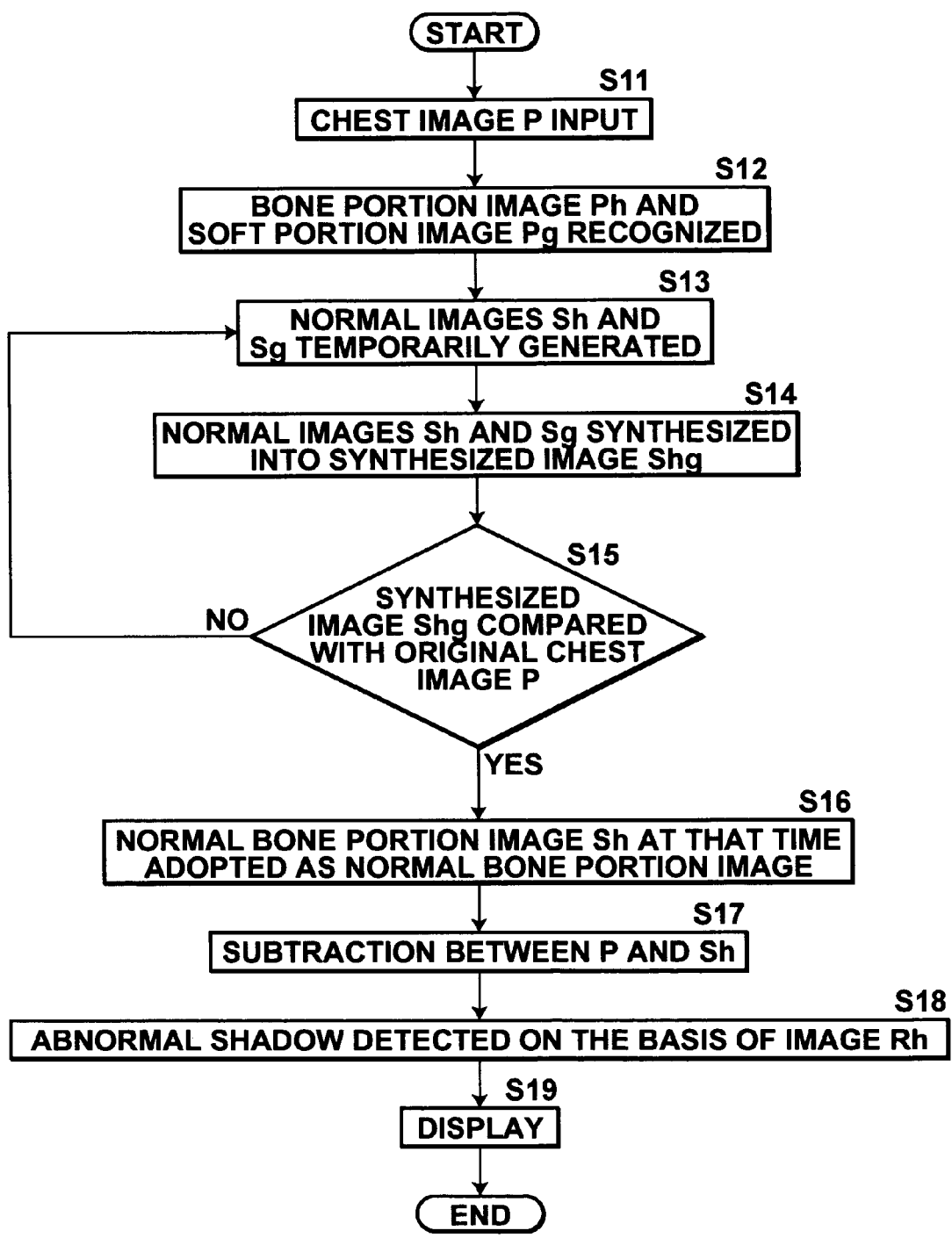
FIG. 8 is a view showing the flow chart for illustrating operation of the first abnormal shadow detecting apparatus.

Operation of the first abnormal shadow detecting apparatus will be described hereinbelow. FIG. 8 is a view showing the flow chart for illustrating operation of the first abnormal shadow detecting apparatus.

Figure 9:
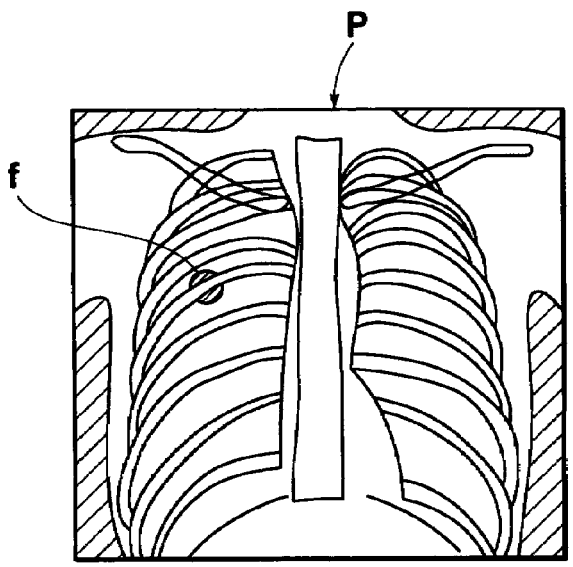
FIG. 9 shows an input chest image P.

The object image input means 10 inputs a chest image P representing a radiation image of a human chest from, for instance, a CR system which can get a radiation image as a digital image or a storage means in which digital radiation images are stored. (step S11) It is assumed here that the chest image P includes an abnormal shadow f representing a cancerous portion behind the bone portion as shown in FIG. 9.

The normal structure element image generating means 20 obtains a normal bone portion image Sh by the following processing on the input chest image P.

Edges of the bone, that is, boundaries between a bone and a soft tissue, are first detected, for instance, by detecting sharp changes of the density in the chest image P, and the chest image P is recognized as an image divided into a bone portion image Ph representing a bone portion and a soft portion image Pg representing a soft portion. (step S12)

Then a normal bone portion image Sh representing normal structure of the bone portion corresponding to the recognized bone portion image Ph and a normal soft portion image Sg representing normal structure of the soft portion corresponding to the recognized soft portion image Pg are temporarily generated (step S13), and the normal bone portion image Sh and the normal soft portion image Sg are synthesized into a synthesized image Shg representing the whole chest (step S14).

The normal bone portion image Sh and the normal soft portion image Sg are generated by obtaining formulae for artificially generating a normal bone portion image and a normal soft portion image according to the technology of AAM described above and employing as the teacher data a sample image representing only a normal bone portion and a sample image representing only a soft portion and by searching for a suitable appearance parameter for each formula.

Figure 10:
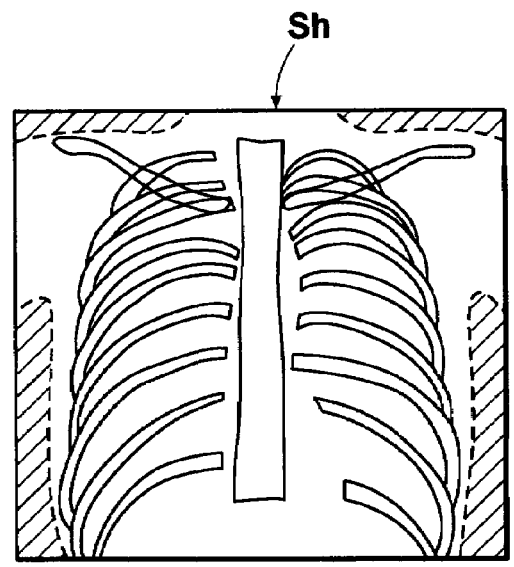
FIG. 10 shows a normal bone portion image Sh.

Then the synthesized image Shg is compared with the original chest image P and it is determined whether they are sufficiently close to each other in pattern of image. (step S15) When they are sufficiently close to each other in pattern of image, the normal bone portion image Sh at that time is determined to be a normal bone portion image corresponding to the bone-portion image Ph. (step S16) Otherwise, the normal bone portion image Sh and/or the normal soft portion image Sg are regenerated by changing the appearance parameter (step S13) and steps S13 to S15 are repeated until they become sufficiently close to each other in pattern of image. For example, when the dispersion of the differences between the corresponding pixels of the images is smaller than a predetermined value, it may be determined that the pattern of image is sufficiently close. FIG. 10 shows a normal bone portion image Sh obtained in this way.

Figure 11:
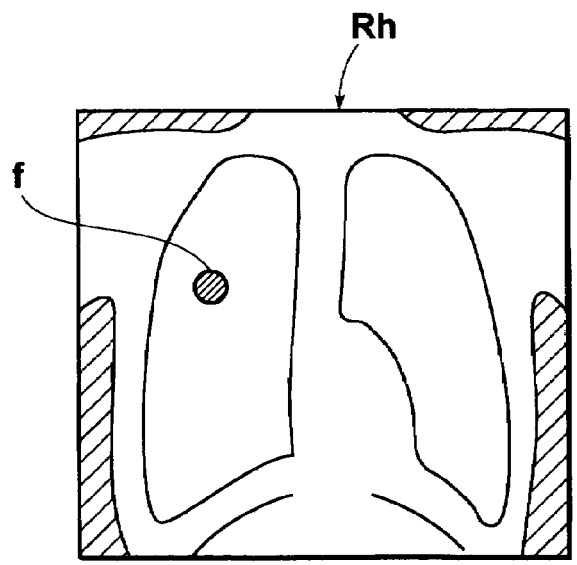
FIG. 11 shows a bone-portion-removed image Rh.

The structure-removed image generating means 30 generates a bone-portion-removed image Rh, an image obtained by removing the bone image from the chest image, by an image operation between the chest image P and the normal bone portion image Sh, that is, by subtraction between the corresponding pixels of the chest image P and the normal bone portion image Sh. (step S17) FIG. 11 shows a bone-portion-removed image Rh thus obtained. The bone-portion-removed image Rh thus obtained keeps information on the soft portion and the abnormal shadow which the chest image P has originally carried and accordingly, the bone-portion-removed image Rh can be used as an energy subtraction image.

The abnormal shadow detecting means 40 detects an abnormal shadow on the basis of the bone-portion-removed image Rh by a known method. (step S18) For example, an abnormal shadow may be detected by a method proposed in Japanese Unexamined Patent Publication No. 2002-109510 in which a shadow of a growth is detected by the use of an iris filter.

The display means 50 displays on a screen such as a CRT or a liquid crystal panel the result of detection of the abnormal shadow together with the bone-portion-removed image Rh. (step S19) The display means 50 may display the normal bone portion image Sh and the original chest image P side by side on a screen or superposed one on the other with the images located to each other on a screen.

In the embodiment 1, when the normal bone portion image Sh and the normal soft portion image Sg are temporarily generated, the recognized bone portion image Ph and soft portion image Pg are compared with each other, a combination of the bone portion image Sh and the soft portion image Sg which are close to each other in the image pattern is only adopted and the combination of the bone portion image Sh and the soft portion image Sg are employed to generate the synthesized image Shg. However, the normal bone portion image Sh and the normal soft portion image Sg may be temporarily generated without comparing the recognized bone portion image Ph and soft portion image Pg by changing the appearance parameters in the formulae generating the images and generating the synthesized image each time the appearance parameter is changed. In this case, in the processing for finding a normal bone portion image Sh corresponding to the bone portion image Ph and determining it, the normal bone portion images Sh, the normal soft portion images Sg and the synthesized images Shg need not be generated as image data but sets of gray level factors may be employed as information to identify the images.

In the processing for temporarily generating the normal bone portion image Sh and the normal soft portion image Sg, and synthesizing them into a synthesized image Shg, the operation for generating the normal bone portion image Sh and the operation for generating the normal soft portion image Sg may be processed in any way, may be separately processed or may be apparently integrally processed, so long as they are essentially separate from each other. For example, when gray levels u and h of the soft portion and the bone portion are expressed as the following formulae (9) and (10) on the basis of the above formula (6), $$u = u_{ave} + Pu \cdot bu \quad (9)$$

$$h = h_{ave} + Ph \cdot bh \quad (10)$$

the gray level of the synthesized image may be apparently integrally processed as follows.

$$u + h = u_{ave} + h_{ave} + [PuPh]\begin{bmatrix} bu \\ bh \end{bmatrix} \quad (11)$$

In the embodiment 1 described above, the bone-portion-removed image Rh, which is an image obtained by removing the bone portion image from the chest image, is obtained by subtracting the normal bone portion image Sh from the chest image P. However, a bone/soft-portion-removed image Rhg, which is an image obtained by removing the bone portion image and the soft portion image from the chest image, may be obtained by subtracting the synthesized image Shg from the chest image P. The bone/soft-portion-removed image Rhg thus obtained keeps information on the abnormal shadow which the chest image P has originally carried and accordingly, the bone/soft-portion-removed image Rhg can be used as a temporal subtraction image.

Embodiment 2

A second abnormal shadow detecting apparatus in accordance with a second embodiment of the present invention will be described hereinbelow. The second abnormal shadow detecting apparatus is basically the same as the first abnormal shadow detecting apparatus except that the process for generating the normal image in the normal structure element image generating means 20.

Figure 12:
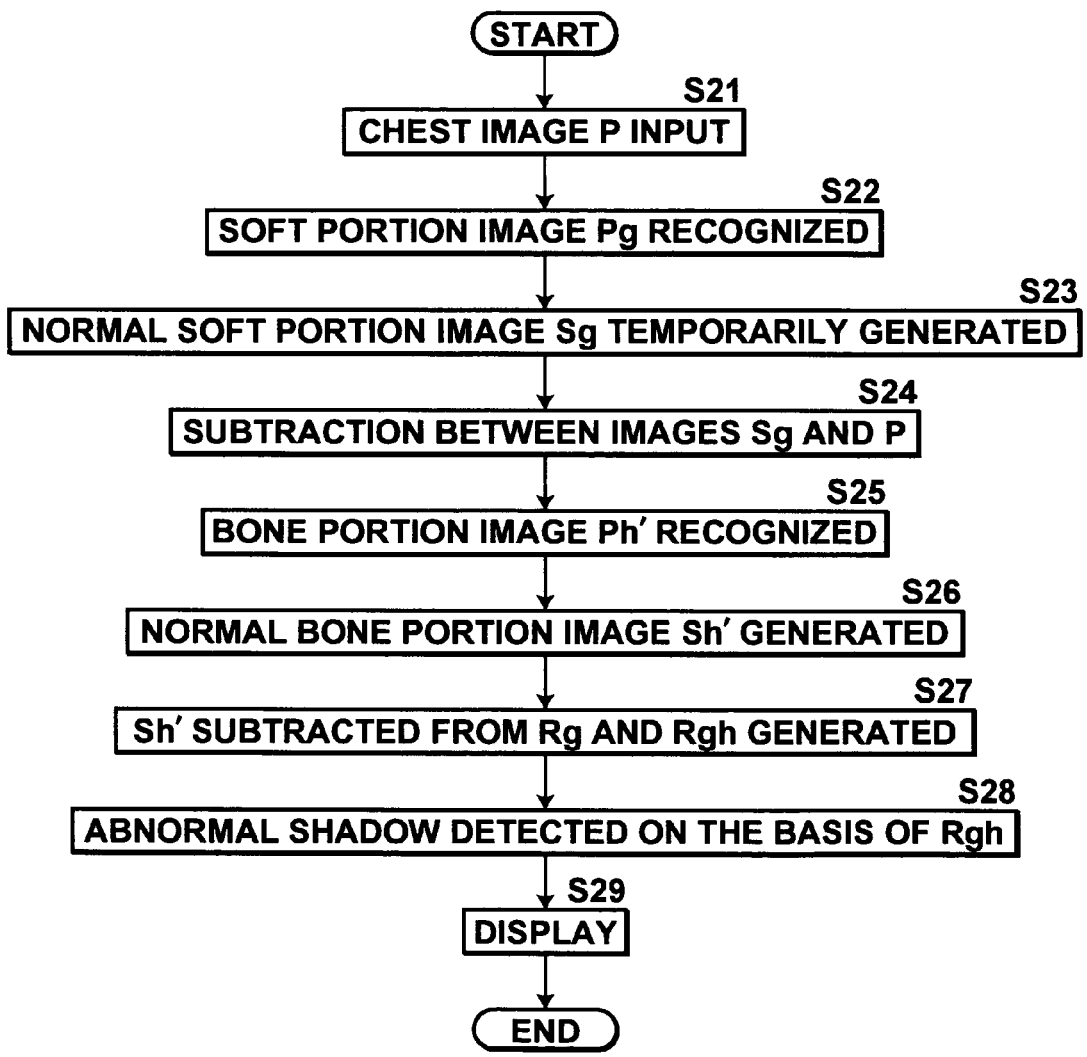
FIG. 12 is view showing the flow chart for illustrating operation of the second abnormal shadow detecting apparatus.

Operation of the second abnormal shadow detecting apparatus will be described hereinbelow. FIG. 12 is view showing the flow chart for illustrating operation of the second abnormal shadow detecting apparatus.

The object image input means 10 inputs a chest image P representing a radiation image of a human chest from, for instance, a CR system or a storage means. (step S21) The normal structure element image generating means 20 obtains a normal bone portion image Sh by the following processing on the input chest image P.

Edges of the bone, that is, boundaries between a bone and a soft tissue, are first detected, for instance, by detecting sharp changes of the density in the chest image P, and a soft portion image Pg representing a soft portion is recognized. (step S22)

Then a normal soft portion image Sg representing normal structure of the soft portion corresponding to the recognized soft portion image Pg are generated (step S23), and the soft-portion-removed image Rg, which is an image obtained by removing the soft portion image from the chest image, is obtained by subtracting the normal soft portion image Sg from the chest image P (step S24). The soft-portion-removed image Rg at this time carries thereon information on the bone portion and the abnormal shadow. Then edges of the bone are detected in the soft-portion-removed image Rg, and a bone portion image Ph' representing a bone portion is recognized in the soft-portion-removed image Rg. (step S25) A normal bone portion image Sh' representing normal structure of the bone portion corresponding to the recognized bone portion image Ph' are generated (step S26)

The normal bone portion image Sh' and the normal soft portion image Sg are generated by obtaining formulae for artificially generating a normal bone portion image and a normal soft portion image according to the technology of AAM described above and employing as the teacher data a sample image representing only a normal bone portion and a sample image representing only a soft portion and by searching for a suitable appearance parameter for each formula.

The structure-removed image generating means 30 generates a soft/bone-portion-removed image Rgh, an image obtained by removing the soft portion image and the bone portion image from the chest image, by an image operation between the soft-portion-removed image Rg and the normal bone portion image Sh', that is, by subtraction between the corresponding pixels of the soft-portion-removed image Rg and the normal bone portion image Sh' (step S27) The soft/bone-portion-removed image Rgh thus obtained keeps information on the abnormal shadow which the chest image P has originally carried and accordingly, the bone/soft-portion-removed image Rgh can be used as a temporal subtraction image.

The abnormal shadow detecting means 40 detects an abnormal shadow on the basis of the soft/bone-portion-removed image Rgh by a method described above. (step S28)

The display means 50 displays on a screen such as a CRT or a liquid crystal panel the result of detection of the abnormal shadow together with the soft/bone-portion-removed image Rgh. (step S29) The display means 50 may display the normal bone portion image Sh' and the original chest image P, the normal soft portion image Sg and the original chest image P, or the soft/bone-portion-removed image Rgh and the original chest image P by side on a screen or superposed one on the other with the images located to each other on a screen.

Embodiment 3

A third abnormal shadow detecting apparatus in accordance with a third embodiment of the present invention will be described hereinbelow. The third abnormal shadow detecting apparatus is basically the same as the first abnormal shadow detecting apparatus except that the process for generating the normal image in the normal structure element image generating means 20.

Figure 13:
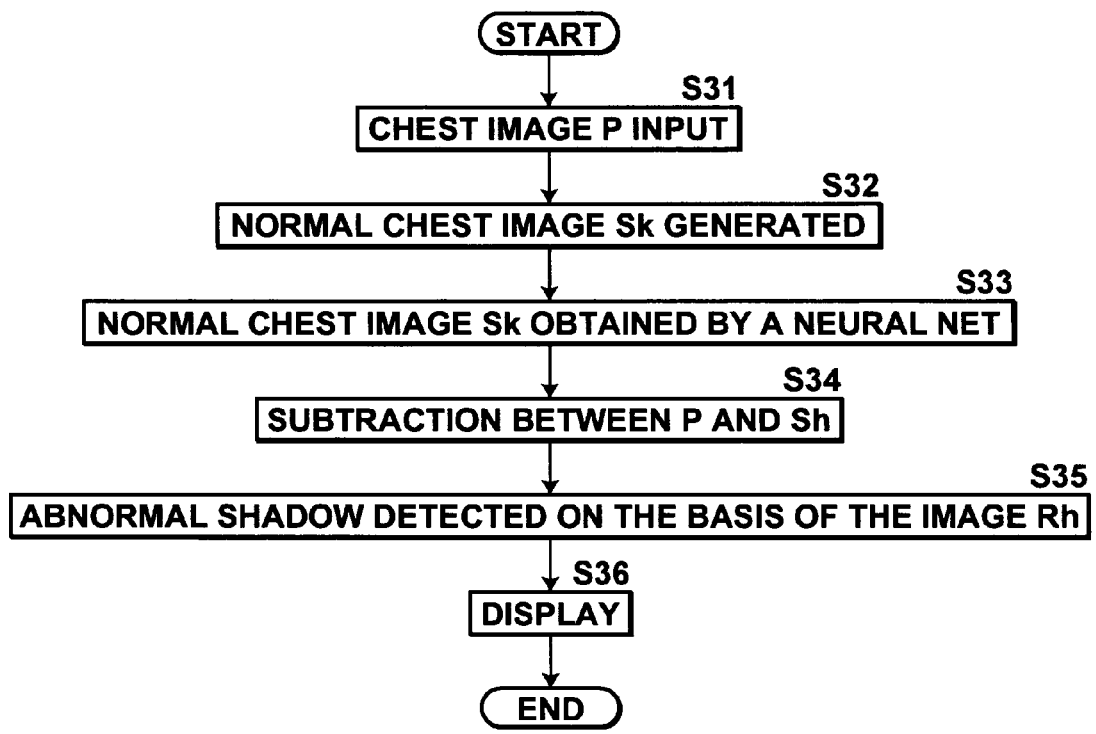
FIG. 13 is view showing the flow chart for illustrating operation of the third abnormal shadow detecting apparatus.

Operation of the third abnormal shadow detecting apparatus will be described hereinbelow. FIG. 13 is view showing the flow chart for illustrating operation of the third abnormal shadow detecting apparatus.

The object image input means 10 inputs a chest image P representing a radiation image of a human chest from, for instance, a CR system or a storage means. (step S31)

The normal structure element image generating means 20 obtains a normal bone portion image Sh by the following processing on the input chest image P.

A normal chest image Sk representing normal structure of the chest corresponding to the chest image P is first generated. (step S32) The normal chest image Sk is generated by obtaining formulae for artificially generating a normal chest image according to the technology of AAM described above and employing as the teacher data a sample image representing a normal chest and by searching for a suitable appearance parameter for each formula.

Then a bone portion image in correspondence to the normal chest image Sk is obtained by the use of a neural net which has learned the correspondence between the chest image and the bone portion image, and the bone portion image in correspondence to the normal chest image Sk is taken as the normal bone portion image representing normal structure of the bone portion corresponding to the bone image Ph in the chest image P. (step S33) Here "the correspondence between the chest image and the bone portion image" may be correspondence between bk and bh, for instance, when gray levels k and h of the chest and the bone portion are expressed as the following formulae (12) and (13) on the basis of the above formula (6).

$$k = k_{ave} + Pk \cdot bk \tag{12}$$

$$h = h_{ave} + Ph \cdot bh \tag{13}$$

Neural net is described in detail in Japanese Unexamined Patent Publication No. 2000-48187.

The structure-removed image generating means 30 generates a bone-portion-removed image Rh, an image obtained by removing the bone image from the chest image, by an image operation between the chest image P and the normal bone portion image Sh obtained by the normal structure element image generating means 20, that is, by subtraction between the corresponding pixels of the chest image P and the normal bone portion image Sh. (step S34) FIG. 11 shows a bone-portion-removed image Rh thus obtained. The bone-portion-removed image Rh thus obtained keeps information on the soft portion and the abnormal shadow which the chest image P has originally carried and accordingly, the bone-portion-removed image Rh can be used as an energy subtraction image.

The abnormal shadow detecting means 40 detects an abnormal shadow on the basis of the bone-portion-removed image Rh by a method described above. (step S35)

The display means 50 displays on a screen such as a CRT or a liquid crystal panel the result of detection of the abnormal shadow together with the bone-portion-removed image Rh. (step S36)

In accordance with the first to third abnormal shadow detecting apparatuses described above, a normal structure element image representing normal structure of one of structure elements of an object an image of which is included in an image of the object is artificially generated on the basis of a single image of the object, and an image which corresponds to an energy subtraction image or a temporal subtraction image can be obtained by an image operation between the image of the object and the normal structure element image of the predetermined structure element. Accordingly, an image from which bones are removed or in which an abnormal shadow is enhanced, can be obtained without a special system and/or a special technique, whereby an image necessary to the image diagnosis can be effectively generated.

Though, in the first to third abnormal shadow detecting apparatuses, a normal image representing normal structure corresponding to a predetermined image is obtained by artificially generating an image, such a normal image can be obtained, for instance, by selecting an image which substantially conforms to the input image in image pattern from the number of images which have been artificially generated in advance (the second image processing method of the present invention). Embodiments employing this method will be described hereinbelow.

Embodiment 4

Figure 14:
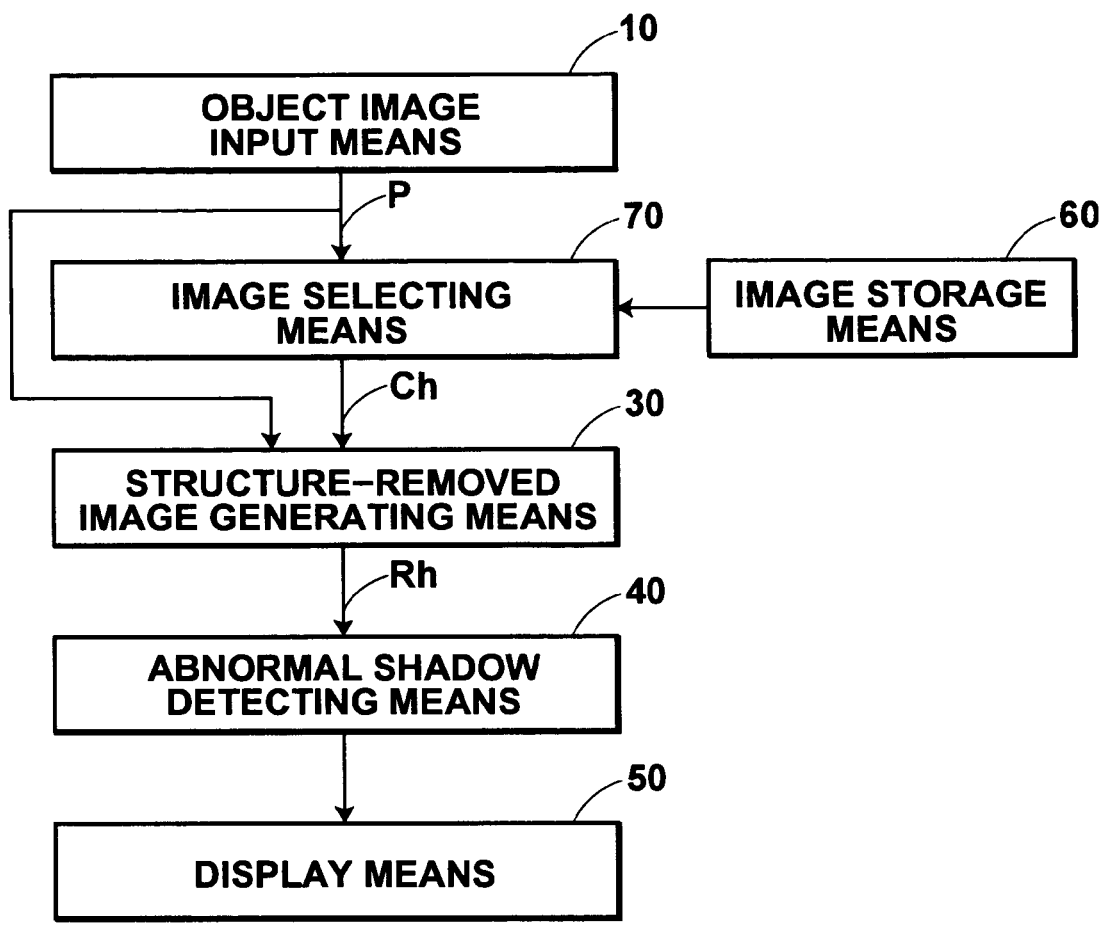
FIG. 14 is a block diagram briefly showing a fourth abnormal shadow detecting apparatus.

FIG. 14 is a block diagram briefly showing a fourth abnormal shadow detecting apparatus. The abnormal shadow detecting apparatus comprises an object image input means 10 which inputs a chest radiation image P (will be referred to simply as "chest image", hereinbelow), an image storage means 60 which stores a plurality of artificially generated normal images representing normal structure of the soft portion and the bone portion in the chest image P, an image selecting means 70 which selects an image Ch substantially conforming to a normal bone portion image Ph representing normal structure of the bone portion image from the images stored in the image storage means 60, a structure-removed image generating means 30 which generates a bone-portion-removed image Rh, which is an image obtained by removing the bone portion image from the chest image, by an image operation between the chest image P and the selected bone portion image Ch, an abnormal shadow detecting means 40 which detects an abnormal shadow in the bone-portion-removed image Rh on the basis of the bone-portion-removed image Rh and a display means 50 which displays on a screen the result of detection of the abnormal shadow together with the bone-portion-removed image Rh.

Operation of the fourth abnormal shadow detecting apparatus will be described hereinbelow. FIG. 15 is a view showing the flow chart for illustrating operation of the fourth abnormal shadow detecting apparatus.

The object image input means 10 inputs a chest image P representing a radiation image of a human chest from, for instance, a CR system which can get a radiation image as a digital image or a storage means in which digital radiation images are stored. (step S41)

The image selecting means 70 obtains a normal bone portion image Sh by the following processing on the input chest image P.

Edges of the bone, that is, boundaries between a bone and a soft tissue, are first detected, for instance, by detecting sharp changes of the density in the chest image P, and the chest image P is recognized as an image divided into a bone portion image Ph representing a bone portion and a soft portion image Pg representing a soft portion. (step S42)

Then a normal bone portion image Sh representing normal structure of the bone portion corresponding to the recognized bone portion image Ph and a normal soft portion image Sg representing normal structure of the soft portion corresponding to the recognized soft portion image Pg are temporarily selected (step S43) from the plurality of artificially generated normal images representing normal structure of the soft portion and the bone portion stored in the image storage means 60, and the normal bone portion image Sh and the normal soft portion image Sg are synthesized into a synthesized image Shg representing the whole chest (step S44).

Then the synthesized image Shg is compared with the original chest image P and it is determined whether they are sufficiently close to each other in image pattern. (step S45) When they are sufficiently close to each other in image pattern, the normal bone portion image Sh at that time is determined to be a normal bone portion image corresponding to the bone-portion image Ph. (step S46) Otherwise, another normal bone portion image Sh and/or another normal soft portion image Sg are selected (step S43) and steps S43 to S45 are repeated until they become sufficiently close to each other in image pattern. For example, when the dispersion of the differences between the corresponding pixels of the images is smaller than a predetermined value, it may be determined that the pattern of image is sufficiently close. The selected artificial image may be used as it is as the normal bone portion image Sh or may be used as the normal bone portion image Sh after it is warped to the recognized bone portion image Ph. The following steps are the same as in the first abnormal shadow detecting apparatus and will not be described here.

In accordance with the fourth abnormal shadow detecting apparatus described above, a normal structure element image representing normal structure of one of structure elements of an object selected from the number of images which have been artificially generated in advance, and an image which corresponds to an energy subtraction image or a temporal subtraction image can be obtained on the basis of one object image by an image operation between the image of the object and the selected image. Accordingly, an image from which bones are removed or in which an abnormal shadow is enhanced, can be obtained without a special system and/or a special technique, whereby an image necessary to the image diagnosis can be effectively generated as in the first to third abnormal shadow detecting apparatus.

Though the fourth abnormal shadow detecting apparatus corresponds to the first abnormal shadow detecting apparatus, those corresponding to the second and third abnormal shadow detecting apparatuses can be arranged.

Though, in the first to fourth abnormal shadow detecting apparatuses described above, the bone-portion-removed image or the soft/bone-portion-removed image is generated, it is of course possible to generate a soft-portion-removed image.

The structure-removed image thus obtained can be used in other than detection of an abnormal shadow. For example, a bone-portion-removed image mainly representing the soft portion may be used in visualization of air inclusion to check the functions of the lung, and a soft-portion-removed image mainly representing the bone portion may be used for diagnosis of bones such as quantification of the bone density.

The image processing apparatus of the present invention can be connected by way of a network or the like to a system including various apparatuses.

FIG. 16 is a view briefly showing an image processing system which is an example of such a system. The image processing system shown in FIG. 16 comprises input modalities 81 such as a CR system, a CT system and an MRI system for obtaining image data representing an object image, a storage means 82 which stores various pieces of data including image data obtained by the input modalities 18, an image processing apparatus 83 which generates a structure-removed image, which is an image obtained by removing a desired structure element from the object image, a display means 84 which outputs on a screen information including various pieces of information such as object image or the structure-removed image, and a film printer 85 which outputs the information as a hard copy.

Operation of the image processing system will be described hereinbelow.

When image data is input from the input modalities 81 or the storage means 82, the image processing apparatus 83 generates a structure-removed image, which is an image obtained by removing a desired structure element from the object image and outputs to the storage means 82, the display means 84 and/or the film printer 85 a generated structure-removed image alone or together with the original image data. When the generated structure-removed image is to be stored in the storage means 82, the generated structure-removed image is linked with the original image data or the original image data is linked with information (parameter upon generation) which can generate again the structure-removed image.

What is claimed is:

1. An image processing method comprising the steps of artificially generating, by a computer, a normal structure element image representing a normal structure of at least one predetermined structure element included in an object by preparing a statistical model of the structure element from teacher data extracted from different normal images of the same kind of object, and
   generating a structure-removed image, which is an image obtained by removing the predetermined structure element from the image of the object, by an image operation between the image of the object and the normal structure element image of the predetermined structure element,
   wherein the generating a normal structure element image comprises:
      obtaining image data representing an image representing normal structure of a structure element the same in kind as the predetermined structure element,
      setting a plurality of structure change vectors for changing the structure of the structure element of the same kind, and
      adding the structure change vectors to the image data.

2. An image processing method as defined in claim 1 in which the step of generating a normal structure element image comprises the steps of
   obtaining image data representing an image representing normal structure of an object the same in kind as said original object,
   setting a plurality of structure change vectors for changing the structure of the object of the same kind,
   generating a normal object image representing a normal structure of the original object corresponding to the image of the object by adding the structure change vectors to the image data, and
   generating the normal structure element image by the use of a neural net which extracts a normal image of a structure element in the normal object image which is the same in kind as the predetermined structure element from the normal object image on the basis of the normal object image.

3. A computer-readable medium including a computer program which causes a computer to execute a image processing method comprising the steps of claim 2.

4. An abnormal shadow detecting method comprising the steps of claim 2, and further comprising detecting an abnormal shadow in the structure-removed image on the basis of the structure-removed image.

5. A computer-readable medium including a computer program which causes a computer to execute abnormal shadow detecting method comprising the steps of claim 4.

6. An image processing method as defined in claim 1 comprising the step of
   selecting an image substantially conforming to a normal structure element image from a plurality of artificially generated different images each representing a normal structure of the structure element.

7. A computer-readable medium including a computer program which causes a computer to execute an image processing method comprising the steps of claim 6.

8. An abnormal shadow detecting method comprising the steps of claim 6, and further comprising detecting an abnormal shadow in the structure-removed image on the basis of the structure-removed image.

9. A computer-readable medium including a computer program which causes a computer to execute abnormal shadow detecting method comprising the steps of claim 8.

10. A computer-readable medium device encoded with computer program which causes a computer to execute an image processing method comprising the steps of claim 1.

11. An abnormal shadow detecting method comprising the steps of claim 1, and further comprising
    detecting an abnormal shadow in the structure-removed image on the basis of the structure-removed image.

12. A computer-readable medium device encoded with a computer program which causes a computer to execute abnormal shadow detecting method comprising the steps of claim 11.

13. An image processing apparatus comprising
    an object image input means which inputs an image representing an object comprising a plurality of structure elements,
    a normal structure element image generating means which artificially generates a normal structure element image representing a normal structure of at least one predetermined structure element included in the object image by preparing a statistical model of the structure element from teacher data extracted from different normal images of the same kind of object, and
    a structure-removed image generating means which generates a structure-removed image, which is an image obtained by removing the predetermined structure element from the image of the object, by an image operation between the image of the object and the normal structure element image of the predetermined structure element
    wherein the normal structure image generating means comprises
       an image data obtaining means which obtains image data representing an image representing normal structure of a structure element the same in kind as the predetermined structure element,
       a setting means which sets a plurality of structure change vectors for changing the structure of the structure element of the same kind, and a structure change vector adding means which adds the structure change vectors to the image data.

14. An image processing apparatus as defined in claim 13 in which the image of the object is a medical image, and the plurality of structure elements have anatomical features of the object.

15. An abnormal shadow detecting apparatus comprising the apparatus of claim 14 and further comprising an abnormal shadow detecting means which detects an abnormal shadow in the structure-removed image on the basis of the structure-removed image.

16. An image processing apparatus as defined in claim 13 comprising:
   an image storage means which stores a plurality of artificially generated different images each representing an image representing normal structure of a structure element the same in kind as the predetermined one of the structure elements of the object, and
   an image selecting means which selects an image substantially conforming to a normal structure element image representing the normal structure.

17. An image processing apparatus as defined in claim 16 in which the image of the object is a medical image, and the plurality of structure elements have anatomical features of the object.

18. An abnormal shadow detecting apparatus comprising the apparatus of claim 16 and further comprising an abnormal shadow detecting means which detects an abnormal shadow in the structure-removed image on the basis of the structure-removed image.

19. An abnormal shadow detecting apparatus comprising the apparatus of claim 13 and further comprising
   an abnormal shadow detecting means which detects an abnormal shadow in the structure-removed image on the basis of the structure-removed image.

20. An image processing apparatus comprising
   an object image input means which inputs an image representing an object comprising a plurality of structure elements,
   a normal structure element image generating means which artificially generates a normal structure element image representing a normal structure of at least one predetermined structure element included in the object image by preparing a statistical model of the structure element from teacher data extracted from different normal images of the same kind of object, and
   a structure-removed image generating means which generates a structure-removed image, which is an image obtained by removing the predetermined structure element from the image of the object, by an image operation between the image of the object and the normal structure element image of the predetermined structure element,
   wherein the normal structure element image generating means comprises
      an image data obtaining means which obtains image data representing an image representing normal structure of an object the same in kind as said original object,
      a structure change vector setting means which sets a plurality of structure change vectors for changing the structure of the object of the same kind,
      a structure change vector adding means which generates a normal object image representing a normal structure of the original object corresponding to the image of the object by adding the structure change vectors to the image data, and
      an image generating means which generates the normal structure element image by the use of a neural net which extracts a normal image of a structure element in the normal object image which is the same in kind as the predetermined structure element from the normal object image on the basis of the normal object image.

21. An abnormal shadow detecting apparatus comprising the apparatus of claim 20 and further comprising
   an abnormal shadow detecting means which detects an abnormal shadow in the structure-removed image on the basis of the structure-removed image.

22. An image processing apparatus as defined in claim 20 in which the image of the object is a medical image, and the plurality of structure elements have anatomical features of the object.

23. An image processing apparatus as defined in claim 20 comprising:
   an image storage means which stores a plurality of artificially generated different images each representing an image representing normal structure of a structure element the same in kind as the predetermined one of the structure elements of the object, and
   an image selecting means which selects an image substantially conforming to a normal structure element image representing the normal structure.

* * * * *